United States Patent Office 2,748,108
Patented May 29, 1956

2,748,108

PROCESSES OF HYDROGENATION AND TO NOVEL CATALYTIC AGENT THEREFOR

Raymond Etienne Paul, Versailles, and Paul Jean Clement Buisson and Nicole Marie Joseph, Paris, France, assignors to Societe des Usines Chimiques Rhone-Poulenc, Paris, France, a French body corporate No Drawing. Application December 26, 1951, Serial No. 263,505

Claims priority, application France December 29, 1950

10 Claims. (Cl. 260—210)

This invention relates to hydrogenation catalysts and to processes of hydrogenation, more particularly of streptomycin, employing the said catalysts.

It is known that alkali borohydrides have a reducing action on solutions of salts of the heavy metals, the reduction in some cases leading to the production of the metal itself and in other cases, for example, in the cases of nickel and cobalt, leading to the formation of metallic borides.

It has been found that the products which are precipitated on reaction of an alkali borohydride e. g. sodium or potassium borohydride, with a solution of at least one salt of nickel or cobalt (i. e. metals of atomic number 27 to 28 inclusive) are very valuable catalysts for use in hydrogenation processes. The precipitated products are herein referred to as the "borides" of nickel and cobalt and this term is to be understood as meaning the products formed by the said reaction.

It has further been found, and this forms a first feature of the present invention, that the activity of the aforesaid catalysts can be promoted by the inclusion therewith of a further metallic compound having a promoting action on nickel and cobalt catalysts. Such further metallic compounds may themselves have a catalytic activity and typical examples are the compounds of molybdenum, tungsten, and chromium, i. e. metals of group VI(a) of the periodic table of the elements, and iron, which falls into the same group as cobalt and nickel.

According to the present invention, therefore, there are provided hydrogenation catalysts which consist of a nickel or cobalt boride, as hereinbefore defined, or a mixture of such borides, the said catalyst being in association with a promoter metal. More particularly according to the present invention the promoter metal is iron or a metal of group VI(a) of the periodic table of the elements. The production of the catalysts can be effected by various techniques but the preferred technique is to add a solution to an alkali borohydride to a solution of the metal salts, the former being poured gradually into the latter. The solution of metal salts will of course contain both the nickel or cobalt salt and a salt of the promoter metal. The optimum relative proportion of the promoter metal depends on the particular process of hydrogenation for which the catalyst is intended to be employed and can easily be determined for any particular case. Molybdenum, tungsten and chromium, used as promoter metals in the proportion of about 2% by weight calculated on the nickel or cobalt, give catalysts of high activity for most hydrogenation processes.

The precipitation of the catalyst may be effected using salts in aqueous solution, preferably slightly acidified, but it is also possible to work with the reagents in solution in an organic solvent, for example methanol.

By carrying out the precipitation in the presence of a carrier material, e. g. infusorial earth, it is possible to obtain precipitates on that carrier as a support.

It is important, in order to preserve the activity of the catalysts at the highest level to handle the precipitates continuously under water.

The precipitates thus obtained are of general value in processes of catalytic hydrogenation and the examples which follow later herein are illustrative of such processes. It is to be understood that while these examples are directed to the hydrogenation of safrole, furfurol or streptomycin, any other compound which it is required to hydrogenate catalytically may be similarly treated.

The catalysts with which the present invention is concerned are however of especial value in the hydrogenation of streptomycin to form dihydrostreptomycin. It is well known to convert streptomycin to dihydrostreptomycin by catalytic hydrogenation and the catalysts employed usually have a basis of precious metal, e. g. platinum or palladium. Such catalysts are very costly and must be very carefully recovered if prohibitive losses are to be avoided. It has been proposed to use Raney nickel catalyst for the purpose but the activity of this catalyst decreases rapidly with use so that in fact the applicants have found that in practice it is not possible to use this catalyst for more than two consecutive hydrogenations of streptomycin.

By means of the catalysts of the present invention, however, the catalytic hydrogenation of streptomycin can be carried out readily and effectively. The hydrogenation is preferably effected using a water-soluble salt of streptomycin such as the hydrochloride, the sulphate or the calcium chloride complex. The streptomycin salt is preferably treated in aqueous solution but an organic solvent may alternatively be employed, e. g. methanol or ethanol. The concentration of the solution of streptomycin salt may vary within wide limits but it is generally advantageous to work at concentrations of the order of 20 to 30%. The catalyst is preferably employed in a quantity corresponding to about 5 to 15% by weight calculated on the streptomycin salt. The hydrogenation conditions may be varied widely but generally it is preferred to operate at 50–100° C. e. g. 75° C. and at a pressure of 10 to 150 kg. per sq. cm.

The following examples will serve to illustrate the production of catalysts according to this invention, and the hydrogenation of streptomycin and other substances by the use of the said catalysts. These examples however are not to be regarded as limiting the invention in any way:

*Example I*

128 cc. of a 5% by weight aqueous solution of nickel acetate (crystalline) and 5 cc. of a 1.28% by weight aqueous solution of sodium molybdate are mixed. 27 cc. of a 10% by weight sodium borohydride solution in water are then added, with stirring, over a period of 15 minutes.

The precipitated catalyst is washed with water and then with absolute alcohol. When agitated in a hydrogen atmosphere at normal pressure and temperature with 20 cc. of a 14.4% furfurol solution in ethyl acetate and 20 cc. of absolute alcohol, furfuryl alcohol is produced in about 40 minutes, and it is possible to continue the hydrogenation beyond this stage with formation of tetrahydrofurfuryl alcohol.

Under the same conditions, 1.5 g. of a Raney-type nickel (obtained by the action of alkali on a nickel-aluminum alloy) in 60 minutes serves only to fix 30% of the theoretical hydrogen corresponding to the formation of the furfuryl alcohol.

*Example II*

To 118 cc. of a 5% by weight aqueous solution of nickel chloride (crystalline) are added 10 cc. of an aqueous solution of sodium tungstate containing 0.03 g. of tungsten.

The mixed catalyst is then precipitated and washed as in Example I.

After agitation for 30 minutes in a hydrogen atmosphere at normal pressure and temperature with a solution of furfurol identical to that of the preceding example, about 20% conversion into furfuryl alcohol is obtained.

Under the same conditions, after 30 minutes treatment with 1.5 g. of a Raney-type nickel, the conversion is only 14%.

If 0.5 cc. of 40% by weight aqueous caustic soda solution is then added to the reaction mixture, the total conversion into furfuryl alcohol is reached with the mixed nickel tungsten boride catalyst in one hour, while with Raney-type nickel the conversion is only 75% after the same period of hydrogenation.

*Example III*

If the sodium tungstate in Example II is replaced by the corresponding quantity of sodium molybdate (5 cc. of 1.29% by weight aqueous solution) and the same furfurol solution is treated as in the preceding examples, the hydrogenation is completed in 55 minutes.

Under the same operating conditions, despite the addition of 0.5 cc. of 40% caustic soda after 30 minutes working, with 1.5 g. of Raney-type nickel the hydrogenation time is 1½ hours.

*Example IV*

To 238 cc. of a 5% by weight aqueous solution of nickel chloride (crystalline) are added 5 cc. of an 8.26% by weight aqueous solution of chromium sulphate (crystalline). The mixture is stirred and into it is run, in 25 minutes, 54 cc. of a 10% by weight aqueous sodium borohydride solution. When the evolution of gas has ceased, the black precipitate collected at the bottom of the flask is carefully washed as in Example I.

One half of the catalyst thus prepared, agitated in a hydrogen atmosphere at normal pressure and temperature with 20 cc. of a 30% by weight solution of safrole in ethyl acetate and 20 cc. of absolute alcohol, produces dihydrosafrole in a theoretical yield in 17 minutes.

Under the same conditions, the hydrogenation time in the presence of 1.5 g. of a Raney-type nickel is also 17 minutes.

With the other half of the catalyst it is possible to hydrogenate 20 cc. of a 14.4% solution of furfurol in ethyl acetate diluted with 20 cc. of absolute alcohol in 40 minutes at normal pressure and temperature with a theoretical yield of furfuryl alcohol.

Under the same temperature and pressure conditions the period of hydrogenation with 1.5 g. of a Raney-type nickel is one hour 15 minutes despite the introduction of 0.5 cc. of 40% caustic soda into the reaction medium at the 30th minute.

*Example V*

By replacing the nickel chloride solution in Example IV by the equivalent quantity of a 5% cobaltous chloride solution, a mixed catalyst is obtained with which it is possible to hydrogenate 16 g. of safrole in solution in 60 cc. of absolute alcohol in 17 minutes at room temperature under a pressure of 50 kg. per sq. cm. Dihydrosafrole is thus obtained in a theoretical yield. The catalyst prepared in the absence of chromium only enables the hydrogenation to be effected at the same speed provided that the operation is carried out under heat (about 60° C.).

*Example VI*

By replacing the nickel chloride solution in Example II by the equivalent quantity of a 5% cobaltous chloride solution, a catalyst is obtained with which it is also possible to obtain dihydrosafrole in a theoretical yield from a solution of 16 g. of safrole in 60 cc. of absolute alcohol in 17 minutes at room temperature and under a hydrogen pressure of 50 kg. per. sq. cm.

*Example VII*

A solution of 27 g. of sodium borohydride in 270 cc. of water is added over a period of 40 minutes to a solution of 61 g. of nickel chloride hexahydrate and 0.6 g. of chromic acid in 1200 cc. of water. The temperature rises from 25°–40° C. The mixture is allowed to stand and is then decanted and filtered, the filtrate being washed with 3 litres of water (the catalyst always being manipulated under a layer of water).

The catalyst thus prepared and a solution of 100 g. of the calcium chloride complex of streptomycin in 280 cc. of water are introduced into a hydrogenation autoclave. Hydrogenation is effected under a pressure of 50 to 60 kg. per sq. cm. at a temperature of 70°–75° C. for three hours. The autoclave is allowed to cool to room temperature and the catalyst is filtered off. When the hydrogenation is complete the ferric maltol test indicates a streptomycin content of about 0.3%. The filtrate is then treated with ammonium carbonate in order to precipitate the calcium ion, and the dihydrostreptomycin hydrochloride thus obtained is converted in known manner into pure dihydrostreptomycin in the solid state.

We claim:

1. A process for the production of a catalyst which comprises reacting an alkali borohydride with a mixture of a salt of a metal selected from the group consisting of cobalt and nickel and a compound of a promoter metal selected from the class consisting of molybdenum, tungsten, iron and chromium.

2. A process for the production of a catalyst which comprises adding gradually a solution of an alkali borohydride to a solution of a mixture of at least one salt of a metal selected from the group consisting of cobalt and nickel and at least one compound of a metal selected from the class consisting of molybdenum, tungsten, iron and chromium.

3. A process of catalytic hydrogenation of a salt of streptomycin which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium.

4. A process of catalytic hydrogenation of streptomycin hydrochloride which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium.

5. A process of catalytic hydrogenation of streptomycin sulphate which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium.

6. A process of catalytic hydrogenation of streptomycin hydrochloride calcium-chloride complex which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium.

7. A process of catalytic hydrogenation of a salt of streptomycin which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium, the said hydrogenation being effected with the streptomycin salt in aqueous solution at concentration of 20–30% by weight, at a temperature of 50–100° C. and a pressure of 10–150 kg. per sq. cm.

8. A process of catalytic hydrogenation of a salt of streptomycin which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium, the proportion of said catalyst being 5 to 15% by weight of the streptomycin salt treated.

9. A process of catalytic hydrogenation of streptomycin hydrochloride calcium chloride complex which comprises effecting such hydrogenation in the presence of a catalyst obtained by reacting an alkali borohydride with a mixture of a salt of a metal selected from the group consisting of cobalt and nickel and a compound of a promoter metal selected from the class consisting of molybdenum, tungsten, iron and chromium the said hydrogenation being effected with the streptomycin salt in aqueous solution at a concentration of 20–30% by weight, at a temperature of 50–100° C. and a pressure of 10–150 kg. per sq. cm., the proportion of said catalyst being 5 to 15% by weight of the streptomycin salt treated.

10. A process of catalytic hydrogenation of streptomycin hydrochloride calcium chloride complex which comprises effecting such hydrogenation in the presence of a catalyst obtained by reacting an alkali borohydride with a mixture of a salt of a metal selected from the group consisting of cobalt and nickel and a compound of chromium, the said hydrogenation being effected with the streptomycin salt in aqueous solution at a concentration of 20–30% by weight, at a temperature of 50–100° C. and a pressure of 10–150 kg. per sq. cm., the proportion of said catalyst being 5 to 15% by weight of of the streptomycin salt treated.

References Cited in the file of this patent

UNITED STATES PATENTS

| | | |
|---|---|---|
| 1,201,226 | Ellis | Oct. 10, 1916 |
| 1,255,590 | Ellis | Feb. 5, 1918 |
| 1,338,709 | Sulzberger | May 4, 1920 |
| 2,498,574 | Peck | Feb. 21, 1950 |
| 2,522,858 | Carboni | Sept. 19, 1950 |
| 2,552,547 | Fried et al. | May 15, 1951 |

OTHER REFERENCES

Sidgwick: "Chemical Elements and Their Compounds," vol. 1, page 362 (1950).